United States Patent
Mizutani et al.

(10) Patent No.: US 8,367,272 B2
(45) Date of Patent: Feb. 5, 2013

(54) METHOD FOR PRODUCING GOLD FINE PARTICLE-SUPPORTED CARRIER CATALYST FOR FUEL CELL, AND POLYMER ELECTROLYTE FUEL CELL CATALYST HAVING GOLD FINE PARTICLE

(75) Inventors: Nobuaki Mizutani, Toyota (JP); Hiroaki Takahashi, Toyota (JP); Yousuke Horiuchi, Kakegawa (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 230 days.

(21) Appl. No.: 12/997,257

(22) PCT Filed: May 27, 2009

(86) PCT No.: PCT/IB2009/005743
§ 371 (c)(1),
(2), (4) Date: Dec. 10, 2010

(87) PCT Pub. No.: WO2009/153630
PCT Pub. Date: Dec. 23, 2009

(65) Prior Publication Data
US 2011/0123909 A1      May 26, 2011

(30) Foreign Application Priority Data
Jun. 17, 2008   (JP) .................................. 2008-158264

(51) Int. Cl.
*H01M 4/02*      (2006.01)
(52) U.S. Cl. ........ 429/532; 429/421; 429/422; 429/481; 429/523; 429/534; 429/535
(58) Field of Classification Search .................. 429/421, 429/422, 442, 481, 523–525, 528, 532, 534, 429/535
See application file for complete search history.

(56) References Cited

FOREIGN PATENT DOCUMENTS

| EP | 0606 051 A1 | 7/1994 |
| JP | 2003-166040 | 6/2003 |
| JP | 2005-118671 | 5/2005 |
| JP | 2005-270863 | 10/2005 |
| JP | 2005118671 A * | 5/2012 |
| WO | WO 03/061827 A | 7/2003 |
| WO | WO 2006/045606 A1 * | 5/2006 |

OTHER PUBLICATIONS

International Search Report in International Application No. PCT/IB2009/005743; Mailing Date: Aug. 11, 2009.
Written Opinion of the International Searching Authority in International Application No. PCT/IB2009/005743; Mailing Date: Aug. 11, 2009.

(Continued)

*Primary Examiner* — Patrick Ryan
*Assistant Examiner* — Ben Lewis
(74) *Attorney, Agent, or Firm* — Finnegan, Henderson, Farabow, Garrett & Dunner, LLP

(57) ABSTRACT

A method for producing a gold fine particle-supported carrier catalyst for a fuel cell, which reduces a gold ion in a liquid phase reaction system containing a carbon carrier by means of an action of a reducing agent, to reduce the gold ion, deposit, and support a gold fine particle on the carbon carrier, wherein a reduction rate of the gold ion is set within the range of 330 to 550 mV/h, and pH is set within the range of 4.0 to 6.0 to perform the reduction of the gold ion, deposition, and support of the gold fine particle.

13 Claims, 3 Drawing Sheets

OTHER PUBLICATIONS

Response to the Written Opinion of the International Searching Authority in International Application No. PCT/IB2009/005743; Mar. 25, 2010.

International Preliminary Report on Patentability in International Application No. PCT/IB2009/005743; Mailing Date: Sep. 29, 2010.

* cited by examiner

METHOD FOR PRODUCING GOLD FINE PARTICLE-SUPPORTED CARRIER CATALYST FOR FUEL CELL, AND POLYMER ELECTROLYTE FUEL CELL CATALYST HAVING GOLD FINE PARTICLE

CROSS-REFERENCE TO RELATED APPLICATIONS

This application is a national phase application of International Application No. PCT/IB2009/005743, filed May 27, 2009, and claims the priority of Japanese Application No. 2008-158264, filed Jun. 17, 2008, the contents of both of which are incorporated herein by reference.

BACKGROUND OF THE INVENTION

1. Field of the Invention

This invention relates to a method for producing a gold fine particle-supported carrier catalyst for a fuel cell, in which a gold fine particle with an average particle diameter of nanometer order is supported. The invention also relates to a polymer electrolyte fuel cell catalyst that contains a gold fine particle, and a polymer electrolyte fuel cell.

2. Description of the Related Art

A fuel cell is required to exhibit high power generation performance over a long period of time; a period of 5000 hours is required in an automotive power supply and a period of 40,000 hours in a fixed power supply. Thus, an electrode catalyst needs to have high catalytic activity and durability. An electrode catalyst that has a porous carbon particle supporting noble metals, base metals, or other catalytic metals is used as the electrode catalyst of high catalytic activity and durability. A method that is generally used as a method for producing the electrode catalyst that has a carbon particle supporting a plurality of noble metals as catalytic metals is, for example, an absorbing method for dispersing and mixing a carbon particle in an aqueous solution that contains a plurality of noble metal compounds, forming a noble metal particle on the carbon particle by adding a reducing agent or precipitant to the mixture, and thereafter burning thus obtained complex noble metal particle.

However, this method causes the plurality of noble metal particles formed by an insolubilization agent to be absorbed randomly by the other noble metal particles or the carrier surface. Therefore, the composition of the alloyed complex noble metal particle formed by burning such noble metal particles becomes uneven and sinters due to the addition of thermal energy, resulting in forming a large particle diameter. As a result, the active area of the complex noble metal particles is reduced, lowering the catalytic activity. In addition, when the absorbing method is used, although the complex noble metal particle is formed/supported on a pore of the carbon particle to which an electrolyte does not sufficiently penetrate, such complex noble metal particle that is not capable of coming into contact with the electrolyte does not sufficiently function as an active component of the electrolyte catalyst. Therefore, the problem was that the effective utilization factor of the supported complex noble metal particle is reduced.

On the other hand, platinum, palladium, or other noble metal is used as a catalyst for a fuel cell catalyst (a catalyst for a fuel cell) or for exhaust purification. However, because the noble metal elements exist on the earth in a limited amount, the usage thereof needs to be reduced as much as possible. Therefore, as a catalyst using a noble metal, for example, the one in which a surface of a carrier particle made of carbon or inorganic compound supports a noble metal fine particle is generally used. Also, because a catalytic action is exerted mainly on the surface of the noble metal, it is effective to reduce the primary particle diameter and increase the specific area ratio of the noble metal fine particle supported on the surface of the carrier particle in the catalyst having the structure described above, in order to reduce the usage of noble metals while keeping a good catalytic action.

Examples of the method for producing these fine metal particles include a high-temperature processing method called an impregnating method, a liquid phase reduction method, and a gas phase method. In recent years, a liquid phase reduction method that can simplify a production facility has been prevalent. That is, a method for using a reducing agent to reduce the metal ions to be deposited in a liquid phase reduction system and deposit the metal fine particles has been prevalent. The advantage of metal fine particles produced by the liquid phase reduction method is that the metal fine particles are not only uniform in the shape of a sphere or grain, but also are suitable especially as a fuel cell catalyst due to a sharp particle size distribution and the small primary particle diameter.

For example, Japanese Patent Application Publication No. 2003-166040 (JP-A-2003-166040) discloses the following method as a method for synthesizing monodisperse alloy fine particles having uniform particle diameter and consisting of a transition metal and noble metal. This method dissolves at least one salt or complex of a transition metal selected from Fe and Co, and at least one salt or complex of noble metals selected from Pt and Pd, into an organic solvent miscible with water or an alcohol, in the presence of an organic protective agent, and heating and refluxing it with the alcohol in an inert atmosphere, to produce a binary alloy consisting of the transition metal and the noble metal.

However, lacking in conciseness and the high cost are the problems of the method for producing metal fine particles using the liquid phase reduction method described above, because this method is a synthesizing method performed under a high-temperature reaction in the organic solvent.

SUMMARY OF THE INVENTION

This invention provides a method for producing, easily and inexpensively, a fuel cell catalyst (a catalyst for a fuel cell), in which a gold fine particle with an average particle diameter of nanometer order is supported. The invention also provides a polymer electrolyte fuel cell catalyst, and a polymer electrolyte fuel cell.

The inventors have discovered that the above problems can be solved by adjusting the reduction rate of a gold ion forming a gold fine particle and pH and reducing the gold ion, depositing, and supporting the gold fine particle, and arrived at this invention.

A first aspect of the invention relates to a method for producing a gold fine particle-supported carrier catalyst for a fuel cell, which reduces a gold ion in a liquid phase reaction system containing a carbon carrier by a reducing agent, to deposit, and support a gold fine particle on the carbon carrier. Here, the reduction rate of the gold ion is set within the range of 330 to 550 mV/h, and pH is set within the range of 4.0 to 6.0 to perform the reduction, deposition, and support.

A second aspect of the invention is a polymer electrolyte fuel cell catalyst that contains the catalyst produced by the method described above. The catalyst produced by the invention is used in a wide range of application. Particularly, the catalyst produced by the invention is used suitably as a fuel cell catalyst by taking advantage of the characteristics of a gold fine particle having an average particle diameter of nanometer order.

A third aspect of the invention is a polymer electrolyte fuel cell that has the catalyst described above.

By adjusting the reduction rate of the gold ion forming the gold fine particle and pH to deposit and support the gold fine particle, it became possible to produce, easily and inexpensively, a carrier supporting the gold fine particle having an average particle diameter of nanometer order. The gold fine particle-supported carrier that supports the gold fine particle having an average particle diameter of nanometer order exhibits high power generation performance when used as a fuel cell catalyst.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF EMBODIMENTS

Figure 1:
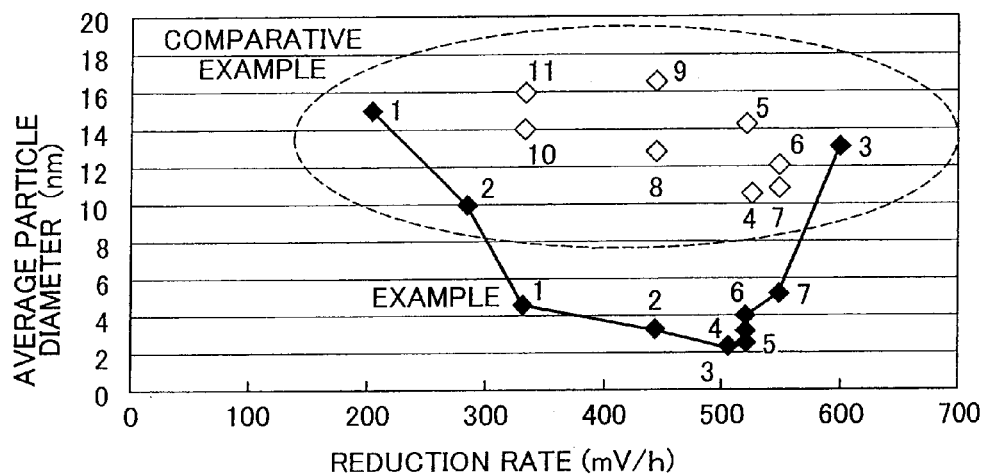
FIG. 1 shows the relationship between a reduction rate and an average particle diameter.

A liquid phase reaction system is prepared by dissolving a gold salt or a gold complex salt, which is a gold compound serving as a gold ion source, and a reducing agent in a solvent common to each component, particularly in water. Therefore, various gold compounds that are soluble to water or other solvent can be used as the gold salt or the gold complex salt that is a gold compound serving as a gold ion source. However, if possible, it is preferred that the gold compound does not contain any impurity elements that might trigger nuclear growth when depositing a gold fine particle and cause abnormal nuclear growth or deteriorate the catalytic performance. Examples of the impurity elements include a halogen element such as chlorine, sulfur, phosphorus, and boron. Thus, it is possible to produce a gold fine particle-supported carrier that supports gold fine particles that have an average particle diameter of nanometer order, are more uniform in the shape of a sphere or grain, and have a sharp particle size distribution.

A variety of compounds can be used as the gold salt or gold complex salt that is the gold compound serving suitably as a gold ion source. Examples of the compounds include tetrachloroauric (III) acid tetrahydrate ($HAuCl_4 \cdot 4H_2O$).

Any of various reducing agents that are capable of depositing the gold fine particle by reducing the gold ion in the liquid phase reaction system can be used as the abovementioned reducing agent. Examples of such reducing agent include sodium borohydride, sodium hypophosphite, hydrazine, and a transition metal element ion (trivalent titanium ion, divalent cobalt ion, and the like). In this regard, in order to make the primary particle diameter of the gold fine particle to be deposited as small as possible, it is preferred that the reduction rate of the gold ion be set within the range of 330 to 550 mV/h and the pH within the range of 4.0 to 6.0 to perform the reduction, deposition and support of the gold fine particle. In order to adjust the reduction rate, deposition rate and supporting rate, it is preferred to select a reducing agent with low reducing power.

Examples of the reducing agent with low reducing power include alcohols such as methanol, ethanol and isopropyl alcohol, ascorbic acid, ethylene glycol, glutathione, organic acids (citric acid, malic acid, tartaric acid, etc.), reducing sugars (glucose, galactose, mannose, fructose, sucrose, maltose, raffinose, stachyose, etc.), and sugar alcohols (sorbitols, etc.).

The density of the reducing agent in the liquid phase reaction system is not particularly limited, but it is preferred that the density of the reducing agent be set within a proper range in accordance with an intended range of the primary particle diameter, because generally the lower the density of the reducing agent, the smaller the primary particle diameter of the gold fine particles within each gold fine particle-supported carrier can be made by lowering the rate of reducing the gold ion, depositing and supporting the gold fine particle. In addition, the pH of the liquid phase reaction system falls within the range of 4.0 to 6.0, in consideration of producing an alloy fine particle having the smallest possible primary particle diameter. As described above, ammonia or carboxylic acid ammonium that does not contain any impurity elements such as alkali metal, alkali earth metal, chlorine or other halogen element, sulfur, phosphorus, boron, and the like is preferably used as a pH adjuster for adjusting the pH of the reaction system within the abovementioned range.

The method for producing a gold fine particle-supported carrier is described hereinafter with illustrations of Examples and Comparative Examples of this invention. Table 1 shows the reduction rate, pH obtained during adjustment, and average particle diameter of gold particles obtained in Examples 1 to 7 and Comparative Examples 1 to 11.

Example 1

A chlorauric acid solution containing 0.5 g of gold was dropped into 1.2 L of purified water having carbon dispersed therein, one gram of sodium citrate was added thereto, and thus obtained solution was stirred thoroughly. Hydrochloric acid was added to this solution to adjust the pH of the solution, and then this solution was reduced at 90° C.

Example 2

A chlorauric acid solution containing 0.5 g of gold was dropped into 1.2 L of purified water having carbon dispersed therein, one gram of ascorbic acid was added thereto, and thus obtained solution was stirred thoroughly. Hydrochloric acid was added to this solution to adjust the pH of the solution, and then this solution was reduced at 90° C.

Example 3

A gold sodium sulfite solution containing 0.5 g of gold was dropped into 1.2 L of purified water having carbon dispersed therein, one gram of sodium citrate was added thereto, and thus obtained solution was stirred thoroughly. Hydrochloric acid was added to this solution to adjust the pH of the solution, and then this solution was reduced at 90° C.

Example 4

A gold sodium sulfite solution containing 0.5 g of gold was dropped into 1.2 L of purified water having carbon dispersed therein, one gram of ascorbic acid was added thereto, and thus obtained solution was stirred thoroughly. Hydrochloric acid was added to this solution to adjust the pH of the solution, and then this solution was reduced at 90° C.

Example 5

A gold sodium sulfite solution containing 0.5 g of gold was dropped into 1.2 L of purified water having carbon dispersed therein, one gram of ascorbic acid was added thereto, and thus obtained solution was stirred thoroughly. Hydrochloric acid was added to this solution to adjust the pH of the solution, and then this solution was reduced at 90° C.

Example 6

A gold sodium sulfite solution containing 0.5 g of gold was dropped into 1.2 L of purified water having carbon dispersed therein, one gram of ascorbic acid was added thereto, and thus obtained solution was stirred thoroughly. Sodium hydroxide was added to this solution to adjust the pH of the solution, and then this solution was reduced at 90° C.

Example 7

A gold sodium sulfite solution containing 0.5 g of gold was dropped into 1.2 L of purified water having carbon dispersed therein, one gram of tannic acid was added thereto, and thus obtained solution was stirred thoroughly. Hydrochloric acid was added to this solution to adjust the pH of the solution, and then this solution was reduced at 90° C.

Comparative Example 1

A chlorauric acid solution containing 0.5 g of gold was dropped into 1.2 L of purified water having carbon dispersed therein, hydrochloric acid was added thereto to adjust the pH of the solution, and thus obtained solution was stirred thoroughly. One hundred grams of aqueous solution containing 0.01 g of sodium borohydride was dropped into this solution at a speed of 1 g/min and then reduced at room temperature.

Comparative Example 2

A chlorauric acid solution containing 0.5 g of gold was dropped into 1.2 L of purified water having carbon dispersed therein, hydrochloric acid was added thereto to adjust the pH of the solution, and thus obtained solution was stirred thoroughly. One hundred grams of aqueous solution containing 0.01 g of hydrazine was dropped into this solution at a speed of 1 g/min and then reduced at room temperature.

Comparative Example 3

A chlorauric acid solution containing 0.5 g of gold was dropped into 1.2 L of purified water having carbon dispersed therein, one gram of ethylene glycol was added thereto, and thus obtained solution was stirred thoroughly. Hydrochloric acid was added to this solution to adjust the pH of the solution, and then this solution was reduced at 90° C.

Comparative Example 4

A gold sodium sulfite solution containing 0.5 g of gold was dropped into 1.2 L of purified water having carbon dispersed therein, one gram of ascorbic acid was added thereto, and thus obtained solution was stirred thoroughly. Hydrochloric acid was added to this solution to adjust the pH of the solution, and then this solution was reduced at 90° C.

Comparative Example 5

A gold sodium sulfite solution containing 0.5 g of gold was dropped into 1.2 L of purified water having carbon dispersed therein, one gram of ascorbic acid was added thereto, and thus obtained solution was stirred thoroughly. Sodium hydroxide was dropped into this solution to adjust the pH of the solution, and then this solution was reduced at 90° C.

Comparative Example 6

A gold sodium sulfite solution containing 0.5 g of gold was dropped into 1.2 L of purified water having carbon dispersed therein, one gram of tannic acid was added thereto, and thus obtained solution was stirred thoroughly. Hydrochloric acid was added to this solution to adjust the pH of the solution, and then this solution was reduced at 90° C.

Comparative Example 7

A gold sodium sulfite solution containing 0.5 g of gold was dropped into 1.2 L of purified water having carbon dispersed therein, one gram of tannic acid was added thereto, and thus obtained solution was stirred thoroughly. Sodium hydroxide was added to this solution to adjust the pH of the solution, and then this solution was reduced at 90° C.

Comparative Example 8

A chlorauric acid solution containing 0.5 g of gold was dropped into 1.2 L of purified water having carbon dispersed therein, one gram of ascorbic acid was added thereto, and thus obtained solution was stirred thoroughly. Hydrochloric acid was added to this solution to adjust the pH of the solution, and then this solution was reduced at 90° C.

Comparative Example 9

A chlorauric acid solution containing 0.5 g of gold was dropped into 1.2 L of purified water having carbon dispersed therein, one gram of ascorbic acid was added thereto, and thus obtained solution was stirred thoroughly. Sodium hydroxide was added to this solution to adjust the pH of the solution, and then this solution was reduced at 90° C.

Comparative Example 10

A chlorauric acid solution containing 0.5 g of gold was dropped into 1.2 L of purified water having carbon dispersed therein, one gram of sodium citrate was added thereto, and thus obtained solution was stirred thoroughly. Hydrochloric acid was added to this solution to adjust the pH of the solution, and then this solution was reduced at 90° C.

Comparative Example 11

A chlorauric acid solution containing 0.5 g of gold was dropped into 1.2 L of purified water having carbon dispersed therein, one gram of sodium citrate was added thereto, and thus obtained solution was stirred thoroughly. Sodium hydroxide was added to this solution to adjust the pH of the solution, and then this solution was reduced at 90° C.

Test Method

A small-angle wide-angle diffraction apparatus (RINT2000) manufactured by Rigaku Corporation and "NANO-Solver (ver. 3.1)" manufactured by Rigaku Corporation were used to obtain the average particle diameters of the gold particles obtained in Example 1 to 7 and Comparative Examples 1 to 11.

TABLE 1

|  | Reduction Rate (mV/h) | pH | Average Particle Diameter (nm) |
|---|---|---|---|
| Example 1 | 330 | 4.0 | 4.5 |
| Example 2 | 440 | 4.3 | 3.2 |
| Example 3 | 510 | 4.4 | 2.1 |
| Example 4 | 520 | 4.2 | 3.0 |
| Example 5 | 520 | 5.6 | 2.5 |
| Example 6 | 520 | 6.0 | 3.6 |
| Example 7 | 550 | 4.0 | 5.0 |
| Comparative Example 1 | 200 | 4.0 | 15 |
| Comparative Example 2 | 280 | 4.0 | 10 |
| Comparative Example 3 | 600 | 4.0 | 13 |
| Comparative Example 4 | 520 | 3.6 | 10.6 |
| Comparative Example 5 | 520 | 6.7 | 14.2 |
| Comparative Example 6 | 550 | 3.2 | 12.2 |
| Comparative Example 7 | 550 | 6.2 | 10.9 |
| Comparative Example 8 | 440 | 2.6 | 12.8 |
| Comparative Example 9 | 440 | 7.8 | 16.6 |
| Comparative Example 10 | 330 | 2.0 | 14 |
| Comparative Example 11 | 330 | 7.3 | 15.9 |

Figure 2:
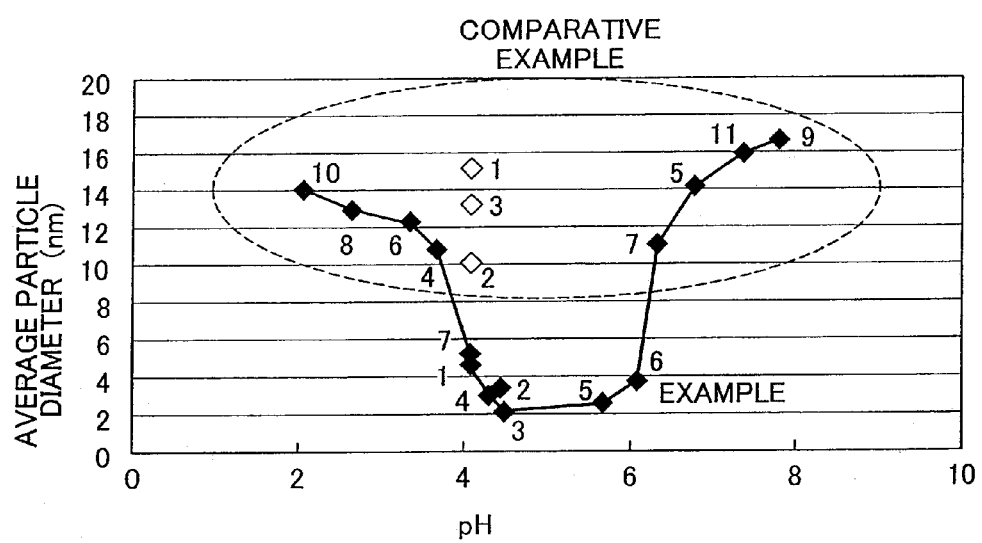
FIG. 2 shows the relationship between a pH obtained during adjustment and the average particle diameter.

FIG. 1 shows the relationship between the reduction rate and the average particle diameter. FIG. 2 shows the relationship between the pH obtained during adjustment and the average particle diameter. In a case in which the reduction rate of the gold ion was set within the range of 330 to 550 mV/h in FIG. 1, and the pH is set within the range of 4.0 to 6.0 in FIG. 2, it is clear that a gold fine particle-supported carrier that supports gold fine particle having an average particle diameter of nanometer order is obtained.

Figure 3:
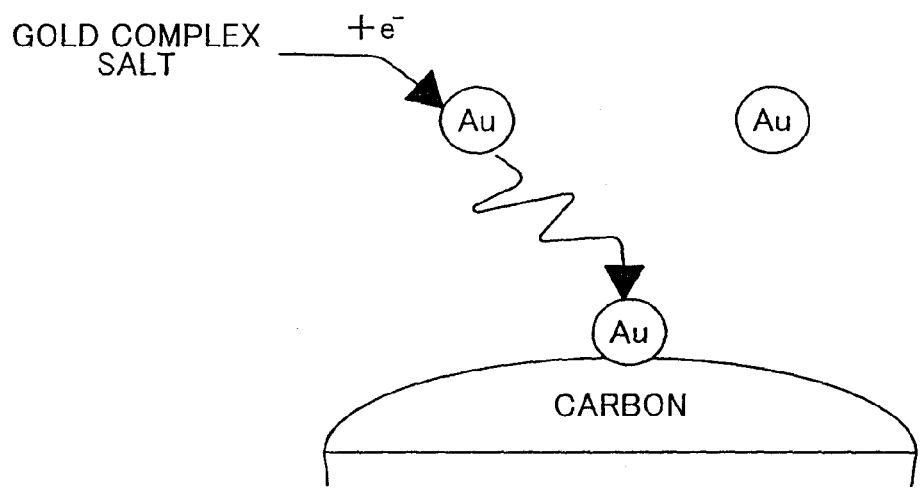
FIG. 3 shows an image where the reduction, deposition and support are performed in Examples 1 to 7.

FIG. 3 shows an image where the reduction, deposition and support are performed in Examples 1 to 7. Proper speeds of generating a gold fine particle and of absorption to the carbon are obtained by optimizing the reduction rate and the pH during adjustment. As a result, a gold fine particle with a particle diameter of nanometer order is supported.

Figure 4:
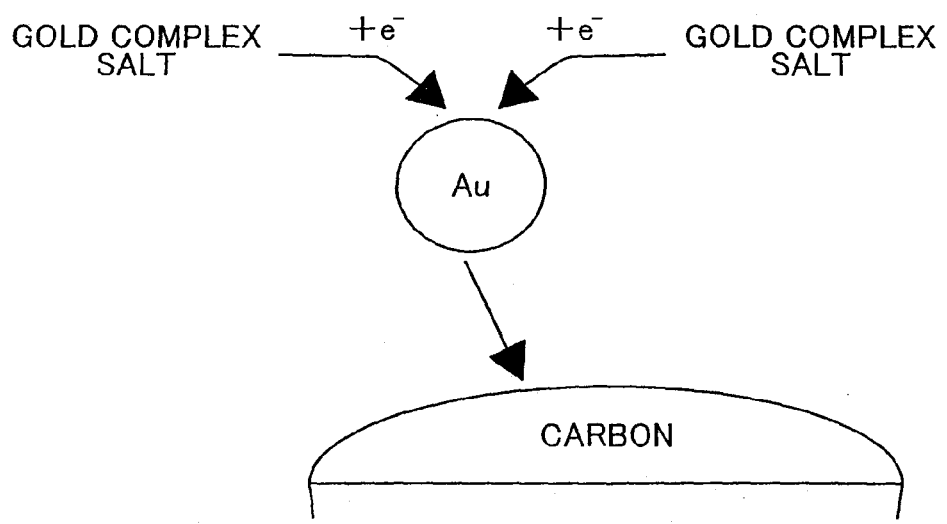
FIG. 4 shows an image where the reduction, deposition and support are performed in Comparative Examples 1 and 2.

FIG. 4 shows an image where the reduction, deposition and support are performed in Comparative Examples 1 and 2. Low gold particle generation speed preferentially grows the gold particle by nucleation, whereby the particle becomes coarse.

Figure 5:
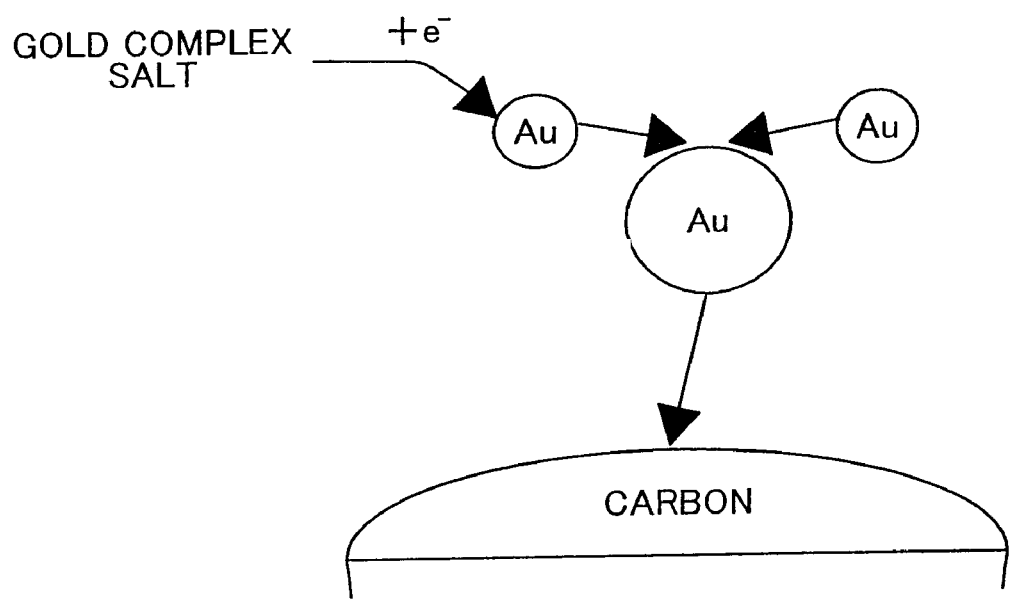
FIG. 5 shows an image where the reduction, deposition and support are performed in Comparative Examples 3 to 11.

FIG. 5 shows an image where the reduction, deposition and support are performed in Comparative Examples 3 to 11. When the gold particle generation speed is higher than the speed of absorption to the carbon, the gold particle becomes aggregated and coarse.

According to the invention, when the gold particle is microparticulated into nanometer order by obtaining appropriate speeds of generating a gold fine particle and of absorption to the carbon, the reaction surface area increases and the catalytic activity improves.

The carrier obtained by the method according to the invention, which supports a gold fine particle having an average particle diameter of nanometer order (for example, 2 to 6 nm in examples shown in FIGS. 1 and 2), exhibits high power generation performance when used as a fuel cell catalyst (a catalyst for a fuel cell).

The invention claimed is:

1. A method for producing a gold fine particle-supported carrier catalyst for a fuel cell, which reduces a gold ion in a liquid phase reaction system containing a carbon carrier by a reducing agent, to reduce the gold ion, deposit, and support a gold fine particle on the carbon carrier,
   wherein a reduction rate of the gold ion is set within the range of 330 to 550 mV/h, and pH is set within the range of 4.0 to 6.0 to perform the reduction of the gold ion, deposition, and support of the gold fine particle.

2. The production method according to claim 1, wherein the gold ion is generated from a complex that does not contain a halogen element, sulfur, phosphorus, or boron.

3. The production method according to claim 1, wherein at least one of sodium borohydride, sodium hypophosphite, hydrazine, and a transition metal element ion is used as the reducing agent for reducing the gold ion.

4. The production method according to claim 1, wherein at least one of methanol, ethanol, isopropyl alcohol, ascorbic acid, ethylene glycol, glutathione, citric acid, malic acid, tartaric acid, glucose, galactose, mannose, fructose, sucrose, maltose, raffinose, stachyose, and sorbitol is used as the reducing agent for adjusting rates of reduction, deposition and support.

5. The production method according to claim 1, wherein at least either ammonia or carboxylic acid ammonium, and the ammonia and carboxylic acid ammonium does not contain any impurity elements such as alkali metal, alkali earth metal, halogen element, sulfur, phosphorus, and boron is used as a pH adjuster.

6. The production method according to claim 1, wherein:
   sodium citrate is added to a chlorauric acid solution and the obtained solution is stirred;
   hydrochloric acid is then added to the solution to adjust pH of the solution; and
   the gold ion is reduced.

7. The production method according to claim 1, wherein:
   ascorbic acid is added to a chlorauric acid solution and the obtained solution is stirred;
   hydrochloric acid is then added to the solution to adjust pH of the solution; and
   the gold ion is reduced.

8. The production method according to claim 1, wherein:
   sodium citrate is added to a gold sodium sulfite solution and the obtained solution is stirred;
   hydrochloric acid is then added to the solution to adjust pH of the solution; and
   the gold ion is reduced.

9. The production method according to claim 1, wherein:
   ascorbic acid is added to a gold sodium sulfite solution and the obtained solution is stirred;
   hydrochloric acid is then added to the solution to adjust pH of the solution; and
   the gold ion is reduced.

10. The production method according to claim 1, wherein:
    ascorbic acid is added to a gold sodium sulfite solution and the obtained solution is stirred;
    sodium hydroxide is then added to the solution to adjust pH of the solution; and
    the gold ion is reduced.

11. The production method according to claim 1, wherein:
    tannic acid is added to a gold sodium sulfite solution and the obtained solution is stirred;

hydrochloric acid is then added to the solution to adjust pH of the solution; and the gold ion is reduced.

12. A catalyst for a polymer electrolyte fuel cell, which contains the gold fine particle produced by the method described in claim 1.

13. A polymer electrolyte fuel cell, comprising the catalyst according to claim 12.

* * * * *